May 20, 1969  J. B. ULAM  3,445,630
COMPOSITE COOKING VESSELS
Filed May 15, 1967
Fig. 1.
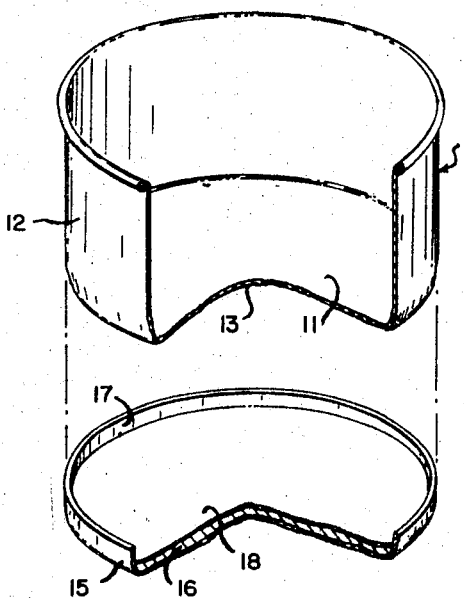
Fig. 2.
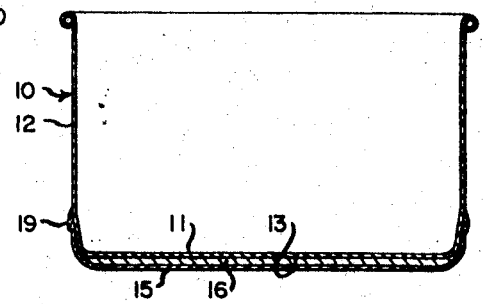
Fig. 3.  Fig. 4.
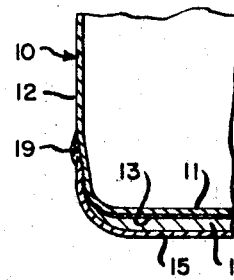 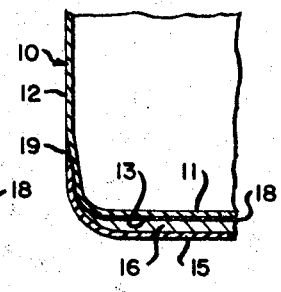
Fig. 5.
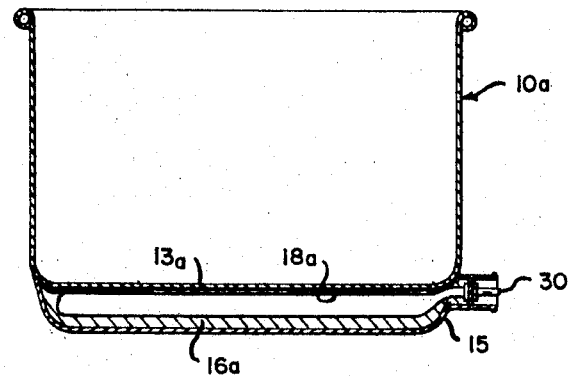
INVENTOR
John B. Ulam United States Patent Office 3,445,630
Patented May 20, 1969

3,445,630
COMPOSITE COOKING VESSELS
John B. Ulam, Peters Township, Pa., assignor to Composite Metal Products, Inc., a corporation of Pennsylvania
Filed May 15, 1967, Ser. No. 638,493
Int. Cl. F27d 11/02
U.S. Cl. 219—438          10 Claims

ABSTRACT OF THE DISCLOSURE

A cooking vessel and method of making such vessel in which a stainless steel or clad metal vessel body is coated on the bottom with metallic aluminum and a saucer-shaped cap of stainless steel with an aluminum cladding member brazed to the bottom with the braze uniting the two aluminum layers and thereafter the stainless steel of the cap is welded to the body of the vessel.

---

This invention relates to composite cooking vessels and particularly to a cooking vessel design to resist sticking, warping and discoloration along with even heat distribution throughout the heating surface of the vessel.

The problems of even heat distribution and resistance to sticking in cooking vessels are well recognized in the trade. Various approaches to the solution of these problems have been heretofore attempted without complete success; for example, cooking vessels have been coated with Teflon coatings over the aluminum or stainless steel body of the vessel so as to make the cooking surfaces resistant to burning and sticking of food. The Teflon surface is, however, very subject to scratching and peeling and, in time, shows wear badly so that the cooking surface loses both its efficiency and its attractiveness. Another approach to the solution of heat distribution and the prevention of burning and sticking of food in cooking vessels has been the development of clad cookware such as stainless clad steel, stainless clad copper and stainless clad aluminum. Such clad metal cookware does incorporate the qualities of improved heat distribution and resistance to discoloration. However, such cooking vessels are only a slight improvement over the solid metals in most respects with the exception of stainless clad aluminum which provides markedly improved heat distribution at a reasonable cost. However, the tendency of food to stick even in stainless clad aluminum is a problem. Several attempts have been made to solve this problem by using double bottom cookware in which two separate bottom pieces are formed on the pan and separated by an air space. However, the problem with such cookware was the very slow heat transfer through the bottom of the vessel which made the vessel unsatisfactory for many purposes.

I have invented a cooking vessel which overcomes these problems and which by its structure provides an outer surface which resists discoloration, is easy to clean and yet is highly resistant to scratching coupled with a controlled heat transfer bottom which gives uniform heat distribution and improved wearing qualities.

Preferably, I provide a vessel body of stainless steel or stainless clad metal having a layer of aluminum covering the bottom thereof. A cap of stainless clad aluminum is formed to fit over the aluminum coataed bottom with the aluminum of the aluminum clad assembly in contact with the aluminum on the bottom of the main body. A brazing material fused to the two aluminum layers to make a unitary assembly and a weld between the main body and the edge of the outer coating of the stainless clad aluminum. Preferably, the aluminum is sprayed on the bottom of the main body by a metalizing gun, however, it may be deposited by casting in place or dipping. The thickness of the aluminum is preferably from about 0.005″ thick to about 0.125″ thick. Preferably a small amount of the aluminum is removed along the edge of the stainless clad aluminum cap prior to its assembly onto the bottom of the main body. The cap and main body are preferably assembled and heated with a brazing material between them to a temperature of about 1075° F. to permit the brazing material to flow and bond the cap and body. Thereafter, the joint between the outside cladding and stainless steel of the stainless sidewall of the main body are welded together with a stainless steel weld. I may include a heating element within the aluminum in the cap.

In the foregoing general description, I have set out certain objects, purposes and advantages of my invention. Other objects, purposes and advantages will become apparent from a consideration of the following description and the accompanying drawings in which:

FIGURE 1 is an exploded isometric view of the parts making up a cooking vessel according to my invention;

FIGURE 2 is a vertical section through a cooking vessel according to the invention prior to grinding and polishing;

FIGURE 3 is a fragmentary section of the cooking vessel of FIGURES 1 and 2 showing the joint line;

FIGURE 4 is a fragmentary enlarged section identical to that of FIGURE 3 after grinding and polishing; and FIGURE 5 is a vertical section through a second embodiment of my invention.

Referring to the drawings, I have illustrated a vessel body 10 of stainless steel or stainless clad metal having a bottom 11 and generally vertical sidewalls 12. A layer of aluminum 13 is formed on the bottom 11 by any well-known metal spraying technique. A cap made up of a stainless clad aluminum having a stainless steel layer 15 and an inner aluminum layer 16 is fitted over the bottom of the vessel. A portion of the aluminum is removed around the edge of the cap to expose a flange 17 of stainless steel. Brazing material 18 is pressed between the aluminum layer 13 on the bottom of the vessel body and the aluminum layer 16 of clad metal. The braze metal is fused to form a unitary metallic bottom. The stainless steel flange 17 is then welded to the stainless steel sidewalls 11 by a weld joint 19 formed by a Heliarc or other stainless steel seam weld. The weld joint is then ground and polished to provide the finished vessel. The provision of the multi-layer bottom with the outside surface of stainless steel provides resistance to discoloration and scratching while providing a mass of heat transfer metal in the form of aluminum sandwiched in between.

In the embodiment illustrated in FIGURE 5, I have incorporated a ribbon type heating element into the joint between the aluminum 13a on the vessel body and the aluminum 16a on the cap and surrounding the same with braze metal 18a to form a structure similar to that of FIGURE 1. An electrical receptacle 30 is attached to the outer shell 15 of the cap to complete the circuitry for an electrically heated vessel.

While I have illustrated and described a presently preferred embodiment of my invention in the foregoing specification, it will be understood that this invention may be otherwise embodied within the scope of the following claims.

I claim:

1. A cooking vessel comprising a formed body of stainless steel, having sidewalls and a bottom portion, a coating of metallic aluminum on the underside of said bottom portion, a saucer-shaped cap of stainless steel having an aluminum inner surface on the inside bottom of the cap surrounded by stainless steel sidewalls, said aluminum inner surface and bottom portion coating of aluminum being connected by a layer of braze metal and a layer of weld metal connecting the periphery of the sidewalls of the stainless steel cap to the stainless steel walls of the vessel body intermediate their top and bottom.

2. A cooking vessel comprising a formed body of stainless steel having a bottom and an upstanding sidewall thereon, a coating of metallic aluminum on the underside of said bottom, a saucer-shaped cap of stainless steel having an aluminum inner surface on the inside surrounded by a stainless steel upstanding flange, said aluminum inner surface and bottom coating of aluminum being connected by a layer of braze metal and a layer of weld metal connecting the stainless steel cap flange to the stainless steel vessel body adjacent the bottom and spaced from the top of the vessel sidewalls.

3. A cooking vessel as claimed in claim 1 wherein an electrical heating element is enclosed within the layer of braze metal between the aluminum surfaces.

4. A cooking vessel as claimed in claim 1 wherein an electrical heating element is enclosed within the aluminum and braze metal separating the outer stainless steel surface and the stainless steel cap.

5. A cooking vessel as claimed in claim 1 wherein the aluminum inner surface on the inside bottom of the cap is spaced inwardly from the edges of the stainless steel cap and the edges of the stainless cap are in tight engagement with the stainless vessel body.

6. The method of making a cooking vessel comprising the steps of:
(a) forming a vessel body having a stainless steel outer surface and having a bottom portion,
(b) applying a coating of metallic aluminum on the bottom portion of said vessel body,
(c) forming a cap of stainless steel having a layer of metallic aluminum attached thereto at the inside bottom generally corresponding to the dimensions of the vessel bottom portion said cap having an upstanding flange of stainless steel surrounding the aluminum layer,
(d) assembling the cap on the bottom of the vessel with a braze metal between the aluminum on the vessel bottom and the aluminum of the cap,
(e) heating the assembly to fuse the braze metal and to braze the aluminum surfaces together, and
(f) welding the edge of the stainless steel cap to the stainless steel outer body surface.

7. The method as claimed in claim 6 wherein the aluminum is applied to the vessel bottom by metal spraying.

8. The method as claimed in claim 6 wherein the aluminum is applied to the vessel bottom by casting a molten layer thereon and solidifying the same.

9. The method as claimed in claim 6 wherein a strip electrical heating element is placed between the two aluminum layers along with the braze metal and embedded therein during the heating or brazing step.

10. A method as claimed in claim 9 wherein an electrical receptacle is formed on the cap and connected to the strip heating element.

References Cited

UNITED STATES PATENTS

| | | | |
|---|---|---|---|
| 2,813,963 | 11/1957 | Lennox | 219—438 |
| 2,841,137 | 7/1958 | Chace | 219—438 |
| 3,064,112 | 11/1962 | Hanzel | 219—438 X |
| 3,271,653 | 9/1966 | Wolf | 219—438 X |
| 3,363,307 | 1/1968 | Ulam | 29—504 |
| 3,373,482 | 3/1968 | Miller | 29—504 |

BERNARD A. GILHEANY, *Primary Examiner.*

H. B. GILSON, *Assistant Examiner.*

U.S. Cl. X.R.

29—611